United States Patent

[11] 3,625,941

[72] Inventors: Raphael Pappo, Skokie; Robert T. Nicholson, Glenview, both of Ill.
[21] Appl. No.: 725,533
[22] Filed: Apr. 30, 1968
[45] Patented: Dec. 7, 1971
[73] Assignee: G. D. Searle & Co., Chicago, Ill.

[54] ALPHA-{2-LOWER ALKYL-2-[2-(6-ALKOXY OR TERTIARY AMINO-1,2,3,4-TETRAHYDRO-NAPHTH-1-YLIDEN)ETHYL]-3-OXOCYCLOPENT-1-YLIDENAMINOXY OR HYDRAZINO} ALKANOIC ACIDS AND ASYMMETRIC PROCESS FOR THEIR PRODUCTION
11 Claims, No Drawings

[52] U.S. Cl. ................................................. 260/247.2 R, 260/239 BF, 260/268 BC, 260/294 D, 260/326.3, 260/518 R, 260/519, 260/999
[51] Int. Cl. ............................................. C07d 87/42
[50] Field of Search ........................................ 260/568, 519, 247.2, 326.3, 268, 294, 239

[56] References Cited
OTHER REFERENCES
Fieser & Fieser Organic Chemistry 3rd Ed. Reinhold Pub. Co. p. 265 (1956)

Primary Examiner—Alex Mazel
Assistant Examiner—Jose Tovar
Attorneys—John M. Brown, John J. Kolano, Elliot N. Schubert, Walter C. Ramm and Helmuth A. Wegner ABSTRACT: Process for the selective manufacture of novel steroid intermediates possessing either the $d$ or $l$ stereo-chemical configuration.

ALPHA-(2-LOWER ALKYL-2-[2-(6-LKOXY OR TERTIARY AMINO-1,2,3,4-TETRAHYDRONAPHTH-1-YLIDEN) ETHYL]-3-OXO CYCLO-PERET-1-YLIDENAMINOXY OR OXO HYDROZINO) ALKONIC ACID AND ASYMMETRIC FORCES FOR THEIR PRODUCTION

The present invention is concerned with a process for the selective manufacture of novel intermediates possessing either the d or l stereochemical configuration and, in particular, intermediates of the following structural formula

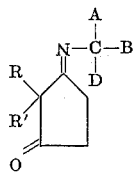

wherein R is a lower alkyl radical, R' is a 2-[2-(6-substituted-1,2,3,4-tetrahydronaphth-1-yliden)ethyl] radical, in which the 6-substituent is lower alkoxy, (optionally alkylated) amino or heterocycloaliphatic amino or a radical of the formula

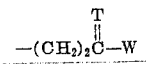

W being a methyl or
$-(CH_2)_3COO(lower\ alkyl)$
radical and

a carbonyl or ketalized carbonyl function, and A, B and D are unidentical members selected from the group consisting of hydrogen and (optionally substituted) hydrocarbon radicals such that there is an appreciable difference in size between the two groups.

The lower alkyl radicals denoted in that structural representation are typified by methyl, ethyl, propyl, butyl, pentyl, hexyl, heptyl and the branched-chain isomers thereof.

Examples of the lower alkoxy radicals represented therein are methoxy, ethoxy, propoxy, butoxy, pentyloxy, hexyloxy, heptyloxy and the corresponding branched-chain isomers.

The heterocycloaliphatic amino radicals represented are, for example, pyrrolidino, piperidino, morpholino, pipecolino, piperazino and hexamethylenimino.

Illustrative of the (optionally substituted) hydrocarbon radicals encompassed by A, B and D are aryl radicals such as phenyl, xylyl, tolyl, naphthyl, also aralkyl radicals such as benzyl, phenethyl, etc., and lower alkyl radicals as hereinbefore exemplified.

The novel process of the present invention is useful in the various recently developed, commercially important steroid total synthesis methods known to the art. Those various methods suffer from the same disadvantage, i.e. an inability to produce the desired steroids having the stereochemical configuration of naturally occurring substances unaccompanied by the formation of an equal amount of the corresponding enantiomorphic form. The most satisfactory solution to that problem would involve the asymmetric synthesis of an intermediate formed early in the total synthesis scheme. Attempts at achieving such a result have been described recently by Gibian et al., Tetrahedron Letters, 21, 2321 (1966), Bucourt et al., Bull. Soc. Chim., 1967, 561 and Bellet et al., Compt. Rend. Acad. Sci., 263, 88 (1966). Gibian et al. thus described the stereoselective reduction of one of the carbonyl groups of 2-methyl-2-[2-(6-methoxy-1,2,3,4-tetrahydronaphth-1-yliden)ethyl]cyclopentane-1,3-dione by the action of a microorganism of the Saccharomyces genus. That process, however, suffers from a number of disadvantages peculiar to microbiological methods, e.g. prolonged reaction time, utilization of very dilute solutions — thus necessitating large reaction volumes, time-consuming and cumbersome procedures. In addition, those methods result in 17-hydroxy intermediates, which must be reoxidized to yield the necessary 17-keto group. Bucourt et al. describe the reaction of the aforementioned diketone, i.e. 2-methyl-2-[ 2-(6-methoxy-1,2,3,4-tetrahydronaphth-1-yliden)ethyl]cyclopentane-1,3-dione with L-tartramic acid hydrazide to afford the corresponding hydrazone. By virtue of its lesser solubility, one of the two possible diastereoisomers is obtained in predominant amount. Fortuitously, that predominant isomer possesses the stereochemical configuration at the newly-produced asymmetric center which is characteristic of naturally occurring steroids.

The process of the present invention involves an asymmetric synthesis, but, in contrast to that of Bucourt et al., does not depend upon relative solubilities of the possible diastereoisomers. To the contrary, the success of the present process results from the surprising and unexpected discovery that one of the two carbonyl groups of the steroid intermediate represented by the following structural formula

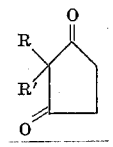

wherein R and R' are as hereinbefore defined, will selectively react with an optically active carbonyl reagent of the following structural formula

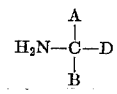

wherein A, B and D are as hereinbefore defined, to form unequal amounts of the diastereomeric intermediates.

The diketo steroid intermediates utilized as starting materials in the present process are derived from 2-alkylcyclopentane-1,3-diones and are manufactured by methods described by Pappo, U.S. Pat. No. 3,337,542, issued Aug. 22, 1967; H. Smith et al., Experientia, XIX, 394 (1963); Boyce and Whitehurst, J. Chem. Soc.,1959, 2022; Velluz et al., Compt. Rend. Acad. Sci., 257, 3086 (1963) and Bellet et al., Compt. Rend. Acad. Sci., 263, 88 (1966).

The aforementioned optically active carbonyl reagents are exemplified by amines, such as α-phenethylamine, and α-aminoxycarboxylic acid and α-hydrazinocarboxylic acid derivatives such as those represented by the following formula

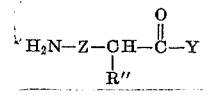

wherein R'' is a hydrocarbon radical, Z is an oxa or imino group and Y is an hydroxy, alkoxy or (optionally substituted) amino radical. Similarly useful are the corresponding amine salts, e.g. the hydrochloride.

Especially preferred optically active carbonyl reagents are those wherein Y is an hydroxy group, i.e. the carboxylic acids, and Z is an oxa or an imino group. These reagents correspond to the known α-aminocarboxylic acids of both natural and unnatural configuration, as exemplified by alanine, leucine, phenylalanine, methionine, arginine and serine.

Examples of suitable α-aminoxycarboxylic acid carbonyl reagents are disclosed by Testa et al., Helv. Chim. Acta., 46, 766 (1963) and in French patent 1316 M, published May 14, 1962, while suitable α-hydrazinocarboxylic acids are described by Niedrich et al., *Jour. Prakt. Chem.*, 27, 108 (1965).

A preferred embodiment of the present invention consists of the process for the manufacture of the novel intermediates represented by the following structural formula

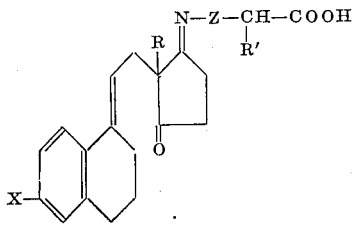

wherein R, R' and Z are as hereinbefore defined and X is a lower alkoxy, (optionally alkylated)amino or heterocycloaliphatic amino radical, those terms being defined hereinbefore.

A specific example of the instant process is the reaction of 2-methyl-2-[2-(6-morpholino-1,2,3,4-tetrahydronaphth-1-yliden)ethyl]cyclopentane-1,3-dione with D-α-aminoxypropionic acid to afford α-{-2-methyl-2-[2-(6-morpholino-1,2,3,4-tetrahydronaphth-1-yliden)ethyl]-3-oxocyclopent-1-ylidenaminoxy}propionic acid.

Cyclization of the latter tricyclic intermediates affords the corresponding tetracyclic intermediates of the following structural formula

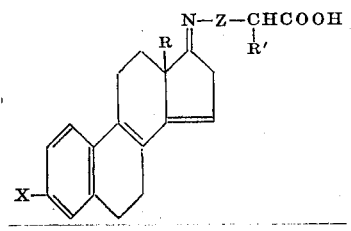

wherein R, R', X and Z are as hereinbefore defined. The aforementioned α-{2-methyl-2-[2-(6-morpholino-1,2,3,4-tetrahydronaphth-1-yliden)ethyl]-3-oxocyclopent-1-ylidenaminoxy}propionic acid, for example, is heated in benzene with p-toluenesulfonic acid to afford α-[(3-morpholinoestra-1,3,5(10),8(9),14-pentaen-17α-yliden)aminoxy]propionic acid.

Hydrolysis of the latter novel tetracyclic intermediates yields the corresponding 17-keto compounds of the following structural formula

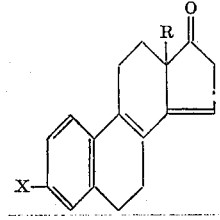

α-[(3-Morpholinoestra-1,3,5(10),8(9),14-pentaen-17α-yliden)aminoxy]propionic acid is thus heated with dilute hydrochloric acid to produce 3-morpholinoestra-1,3,5(10),8(9),14-pentaen-17-one. Conversion of the instant tetracyclic pentaene novel intermediates to pharmacologically useful substances is effected by processes described, for example, in U.S. Pat. No. 3,325,481, issued June 13, 1967. By those processes of selective hydrogenation of the 14(15) double bond, chemical reduction of the 8(9) double bond, Birch reduction of the A-ring and acid hydrolysis, there are produced the diketones of the following structural formula

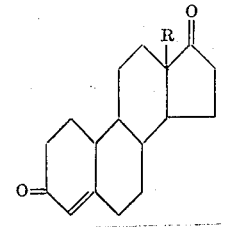

wherein R is as hereinbefore defined. As is described in the latter patent, those diketones are useful as intermediates in the manufacture of pharmacologically active compounds. Estr-4-ene-3,17-dione thus can be converted, by the processes described therein, to 17α-ethynylestr-4-ene-3β,17β-diol 3,17-diacetate, a substance known for its potent progestational properties.

The invention will appear more fully from the examples which follow. The examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees Centigrade (°C.). Quantities of materials are expressed in parts by weight unless otherwise noted.

EXAMPLE 1

(+)Aminoxypropionic acid hydrochloride in the amount of 20.98 parts is dissolved in 148 parts by volume of 1 N sodium hydroxide and the resulting clear solution is evaporated to dryness under reduced pressure. The crystalline solid thus obtained is triturated with pyridine, collected by filtration and washed on the filter with fresh pyridine. The filter cake consisting of sodium chloride is discarded and the filtrate is evaporated to dryness under reduced pressure. Traces of pyridine are removed by codistillation with water. There is thus obtained (+)aminoxypropionic acid, melting at about 132°–134° and exhibiting an optical rotation, in water, of +144°. Further purification is effected by trituration with ethanol followed by recrystallization from aqueous ethanol, thus affording small needlelike crystals, melting at about 138°–138.5° and displaying an optical rotation, in water, of +140°.

EXAMPLE 2

To a solution of 16.77 parts of 2-methyl-2-[2-(6-morpholino-1,2,3,4-tetrahydronaphth-1-yliden)ethyl]cyclopentane-1,3-dione in 54 parts of tetrahydrofuran is added 1 part of (+)aminoxypropionic acid followed by 2 parts of water. The resulting reaction mixture is kept at −30° and stirred for approximately 120 hours, then is stripped of solvent by distillation under reduced pressure. The residual oily material is dissolved in 1:1 ether-benzene and that organic solution is washed successively with water, dilute aqueous sodium hydroxide and water until neutral. The combined alkaline and aqueous washings are neutralized with acetic acid and the acidic mixture is extracted with benzene. The benzene solution is washed with water, dried over anhydrous sodium sulfate and evaporated to dryness under reduced pressure to afford a foamlike residue consisting of α-{2-methyl-2-[2-(6-morpholino-1,2,3,4-tetrahydronaphth-1-yliden)ethyl]-3-oxocyclopent-1-ylidenaminoxy}propionic acid, which compound displays an optical rotation, in chloroform, of −35°.

EXAMPLE 3

A mixture containing 2 parts of α-{2-methyl-2-[2-(6-morpholino-1,2,3,4-tetrahydronaphth-1-yliden)ethyl]-3-oxocyclopent-1-ylidenaminoxy} propionic acid, 53 parts of benzene and 0.2 part of p-toluenesulfonic acid monohydrate is heated at the reflux temperature under nitrogen for about 1½ hours, then is cooled to room temperature, washed with water, dried over anhydrous sodium sulfate and evaporated to dryness under reduced pressure. The residual crude product, isolated as a tan foam, exhibits an optical rotation, in chloroform, of +28.5° and also ultraviolet absorption maxima at about 229 and 324 millimicrons. That material is twice recrystallized from ether to afford rosette-like crystals of pure α-[(3-morpholinoestra-1,3,5(10),8(9),14-pentaen-17α-yliden)aminoxy]propionic acid, melting at about 181°–183° with decomposition and exhibiting an optical rotation, in chloroform, of +100°.

EXAMPLE 4

To a solution of 3.18 parts of dl 3-morpholinoestra-1,3,5(10),8(9),14-pentaen-17-one in 45 parts of tetrahydrofuran is added 1.1 parts of (+)aminoxypropionic acid followed by 2 parts of water. The resulting reaction mixture is stirred, under nitrogen, at room temperature for about 72 hours, then is evaporated to dryness under reduced pressure. The resulting residue is dissolved in benzene and the benzene solution washed with water, then extracted with dilute aqueous sodium hydroxide. The semisolid which forms during the extraction is combined with the extracts and that mixture is neutralized with acetic acid. Extraction of the acidic mixture with benzene affords an organic solution, which is washed with water, then dried over anhydrous sodium sulfate and evaporated to dryness to afford a dark foamlike residue. That material is purified by clarification with decolorizing carbon in ether, thus affording a 50:50 mixture of the diastereomeric α-[(3-morpholinoestra-1,3,5(10),8(9),14-pentaen-17α-yliden)aminoxy]propionic acids, characterized by an optical rotation in chloroform, of +18°. It displays ultraviolet absorption maxima at about 234.5 and 325 millimicrons. Fractional crystallization of that material from ether results in a single pure isomer, melting at about 186°–188° with decomposition and exhibiting an optical rotation, in chloroform, of −52.5°.

EXAMPLE 5

To a solution of 14 parts of 2-methyl-2-[2-(6-morpholino-1,2,3,4-tetrahydronaphth-1-yliden)ethyl]cyclopentane-1,3-dione in 45 parts of tetrahydrofuran is added 2 parts of water and the resulting mixture is cooled to −20°. At that point 1.47 parts of (+)α-aminoxyisocaproic acid is added and the mixture is stirred at that temperature for about 120 hours. At the end of that time the solvent is removed by distillation under reduced pressure and the residue is extracted with benzene. The benzene solution is extracted several times with dilute aqueous sodium hydroxide and those combined extracts are acidified with acetic acid. Extraction of the resulting acidic mixture with benzene-ether affords a solution, which is washed with water, dried over anhydrous sodium sulfate and stripped of solvent to afford α-{2-methyl-2-[2-(6-morpholino-1,2,3,4-tetrahydronaphth-1-yliden)ethyl]-3-oxocyclopent-1-ylidenaminoxy isocaproic acid, which is characterized by an optical rotation, in chloroform, of −38.5°.

EXAMPLE 6

A mixture containing 105.6 parts of benzene and 0.272 part of p-toluenesulfonic acid monohydrate is partially distilled to achieve dryness, at which time 3 parts of α-{2-methyl-2-[2-(6-morpholino-1,2,3,4-tetrahydronaphth-1-yliden)ethyl]-3-oxocyclopent-1-ylidenzminoxy isocaproic acid is added. The resulting reaction mixture is distilled slowly over a period of about 90 minutes in a nitrogen atmosphere, at the end of which time it is cooled, washed with water, dried over anhydrous sodium sulfate and concentrated to dryness by distillation under reduced pressure. The resulting residue is extracted into ether and the organic solution is decolorized with activated carbon, then is stripped of solvent under reduced pressure to afford 2.32 parts of α-[(3-morpholinoestra-1,3,5(10),8(9),14-pentaen-17α-yliden)aminoxyl]isocaproic acid, characterized by an optical rotation, in chloroform, of +34.5°.

EXAMPLE 7

A mixture containing 1 part of α-[(3-morpholinoestra-1,3,5(10),8(9),14-pentaen-17α-yliden)aminoxy]isocaproic acid, 0.2 part of diazomethane and 20 parts of methanol is allowed to stand at room temperature for about 5 minutes. At the end of that time the solvent is removed by distillation under reduced pressure. The resulting residue is extracted into ether-benzene and the organic solution is washed successively with dilute aqueous potassium bicarbonate and water, then dried over anhydrous sodium sulfate and stripped of solvent under reduced pressure. Crystallization of the residual material from ether affords 0.265 part of methyl α-[(3-morpholinoestra-1,3,5(10),8(9),14-pentaen-17α-ylidenaminoxy]isocaproate, melting at about 154.5°–156.5° and exhibiting an optical rotation, in chloroform, of +80.5°. From the mother liquors there is obtained an additional 0.285 part of that same material.

EXAMPLE 8

To a solution of 1.4 parts of 2-methyl-2-[2-(6-morpholino-1,2,3,4-tetrahydronaphth-1-yliden)ethyl]cyclopentane-1,3-dione in 4.5 parts of tetrahydrofuran is added successively 0.2 part of water and 0.15 part of (+) α-hydrazinoisocaproic acid. The mixture becomes homogeneous after stirring for about 24 hours, at the end of which time it is stored at room temperature for an additional 24 hours. The reaction mixture is then diluted with ether and benzene and extracted with dilute aqueous sodium hydroxide. These alkaline extracts are combined, washed with ether, then acidified to pH 4 with acetic acid. That acidic mixture is extracted with ether and the ether layer is separated, washed with water, then concentrated to dryness under reduced pressure to afford α-{2-methyl-2-[2-(6-morpholino-1,2,3,4-tetrahydronaphth-1-yliden)ethyl]-3-oxocyclopent-1-ylidenhydrazino}isocaproic acid, characterized by an optical rotation, in chloroform, of −12°.

EXAMPLE 9

When an equivalent quantity of α-{2-methyl-2-[2-(6-morpholino-1,2,3,4-tetrahydronaphth-1-yliden)ethyl]-3-oxocyclopent-1-ylidenhydrazino}isocaproic acid is substituted in the procedure of example 3, there is produced α-[(3-morpholinoestra-1,3,5(10),8(9),14-pentaen-17α-yliden)hydrazino]isocaproic acid.

EXAMPLE 10

To a solution of 12 parts of 2-methyl-2-[2-(6-methoxy-1,2,3,4-tetrahydronaphth-1-yliden)ethyl]cyclopentane-1,3-dione in 113 parts of tetrahydrofuran is added 4.2 parts of water and the resulting mixture is cooled to approximately −20°, at which time 2.1 parts of (−) α-aminoxypropionic acid is added. The resulting reaction mixture is stirred at approximately −20° for about 100 hours, at the end of which time the solvent is removed by distillation under reduced pressure and the resulting residue is diluted with benzene, then washed with water. Extraction of that organic solution with dilute aqueous sodium hydroxide followed by acidification with acetic acid of those extracts and extraction of the acidified solution with benzene affords an organic solution, which is washed with water, dried over anhydrous sodium sulfate and stripped of solvent under reduced pressure, thus affording α-{2-methyl-2-[2-(6-methoxy-1,2,3,4-tetrahydronaphth-1-yliden)ethyl]-3-oxocyclopent-1-ylidenaminoxy}propionic acid, characterized by an optical rotation in chloroform, of −40°.

EXAMPLE 11

A mixture of 176 parts of benzene and 0.1 part of p-toluenesulfonic acid monohydrate is slowly distilled until anhydrous. To that solution is then added 4 parts of α-{2-methyl-2-[2-(6-methoxy-1,2,3,4-tetrahydronaphth-1-yliden)ethyl]-3- oxocyclopent-1-ylidenaminoxy}propionic acid and the resulting mixture is slowly distilled over a period of about 10 minutes. The mixture is then cooled at 0°–5°, washed with water, dried over anhydrous sodium sulfate and stripped of solvent by distillation under reduced pressure. The resulting residue is extracted into ether and the organic solution is decolorized with activated carbon, then stripped of solvent to afford the crude product. Purification of that material by recrystallization form ether yields α-[(3-methoxyestra-1,3,5(10),8(9),14-pentaen-17α-yliden)aminoxyl]propionic acid, melting at about 147°–153.5° and displaying an optical rotation, in chloroform, of +112.5°.

EXAMPLE 12

When an equivalent quantity of 2-methyl-2-[2-(6-dimethylamino-1,2,3,4-tetrahydronaphth-1-yliden)ethyl]cyclopentane-1,3-dione is substituted in the procedure of example 2, there is obtained α-{2-methyl-2-[2-(6-dimethylamino-1,2,3,4-tetrahydronaphth-1-yliden)ethyl]-3-oxocyclopent-1-ylidenaminoxy}propionic acid.

EXAMPLE 13

The substitution of an equivalent quantity of α{2-methyl-2-[2-(6-dimethylamino-1,2,3,4-tetrahydronaphth-1-yliden)ethyl]-3-oxocyclopent-1-ylidenaminoxy}propionic acid in the procedure of example 3 results in α-[(3-dimethylaminoestra-1,3,5(10),8(9),14-pentaen-17α-yliden)aminoxy]propionic acid.

EXAMPLE 14

By substituting an equivalent quantity of 2-methyl-2-[2-(6-ethoxy-1,2,3,4-tetrahydronapth-1-yliden)ethyl]cyclopentane-1,3-dione and otherwise proceeding according to the processes described in example 2, there is produced α{2-methyl-2-]2-(6-ethoxy-1,2,3,4-tetrahydronapth-1-yliden)ethyl]-3-oxocyclopent-1-ylidenaminoxy}propionic acid.

EXAMPLE 15

The substitution of an equivalent quantity of α{2-methyl-2-[2-(6-ethoxy-1,2,3,4-tetrahydronaphth-1-yliden)ethyl]-3-oxocyclopent-1-y}isocaproic acid in the procedure of example 3 results in [(-ethoxyestra-1,3,5(10,8(9),14-pentaen-17acid.

EXAMPLE 16

A mixture containing 2 parts of α{2-methyl-2-[2-(6-morpholino-1,2,3,4-tetrahydronaphth-1-yliden)ethyl]-3-oxo-cyclopent-1-ylidenaminoxy }isocaproic acid, 0.5 part of diazomethane, 10 parts of ether and 20 parts of methanol is allowed to stand at room temperature for about 5 minutes. Removal of the solvent and excess reagent by distillation under reduced pressure affords methyl α-{ 2-methyl-2-[2-(6-morpholino-1,2,3,4-tetrahydronaphth-1-yliden)ethyl]-3-oxo-cyclopent-1-ylidenaminoxy }isocaproate.

To a solution of the latter methyl ester in 35 parts of benzene is added 0.09 part of p-toluenesulfonic acid and the resulting reaction mixture is slowly distilled, under nitrogen, for about 3 hours. At the end of that time the mixture is cooled and 0.09 part of potassium carbonate is added. That solution is then washed successively with dilute aqueous potassium bicarbonate and water, dried over anhydrous sodium sulfate and stripped of solvent under reduced pressure. The resulting residue is dissolved in ether and that solution is clarified by means of decolorizing carbon. Distillation of the solvent under reduced pressure affords methyl α-[(3-morpholinoestra-1,3,5(10),bh8(9),14-pentaen-17α-yliden) aminoxy] isocaproate, characterized by an optical rotation, in chloroform, of +80.5°. It is identical with the product of example 7.

What is claimed is:

1. In a process for the selective manufacture of steroidal derivatives possessing either the d or l stereochemical configuration, the step which comprises reacting a steroid intermediate of the following formula

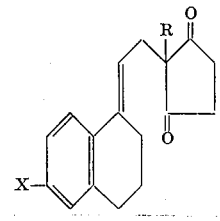

wherein R is lower alkyl and X is lower alkoxy, diamino, pyrrolidino, piperidino, morpholino, pipecolino, piperazino or hexamethylenimino, with an optically active α-substituted carboxylic acid of the following formula

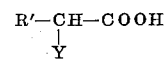

wherein R' is lower alkyl and Y is aminoxy or hydrazino, to afford a compound of the following formula

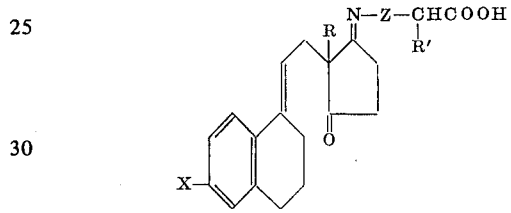

wherein R, R' and X are as hereinbefore defined and Z is oxa or imino.

2. The process of claim 1, wherein Y is aminoxy and Z is oxa.

3. The process of claim 1, wherein Y is hydrazino and Z is imino.

4. As in claim 1, the process which comprises reacting 2-methyl-2-[2-(6-morpholino-1,2,3,4-tetrahydronaphth-1-yliden)ethyl]cyclopentane-1,3-dione with optically active α-aminoxypropionic acid to afford unequal amounts of the diastereomeric α{2-methyl-2[2-(6-morpholino-1,2,3,4-tetrahydronaphth-1-yliden)ethyl]3-oxocyclopent-1-ylidenaminoxy} propionic acids.

5. As in claim 1, the process which comprises reacting 2-methyl2-[2-(6-morpholino-1,2,3,4-tetrahydronaphth-1-yliden)ethyl]cyclopentane-1,3-dione with optically active α-aminoxyisocaproic acid to afford unequal amounts of the diastereomeric α- {2-methyl-2-[2-(6-morpholino 1,2,3,4tetrahydronaphth-1-yliden)ethyl]-3-oxocylopent-1-ylidenaminoxy }isocaproic acids.

6. As in claim 1, the process which comprises reacting 2-methyl-2-[2-(6-methoxy-1,2,3,4-tetrahydronaphth-1-yliden)ethyl]cyclopetane-1,3-dione with optically active α-aminoxypropionic acid to afford unequal amounts of the diastereomeric α- {2-methyl-2-[2-(6-methoxy-1,2,3,4-tetrahydronaphth-1-yliden)ethyl]-3-oxocyclopent-l-ylidenaminoxy } propionic acid.

7. A compound of the formula

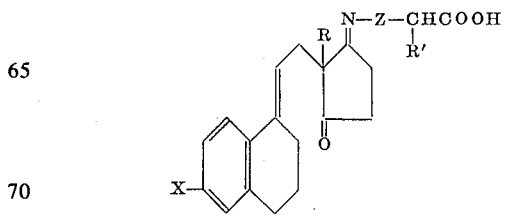

wherein X is lower alkoxy, di-(lower ahkyl)amino, pyrrolidino, piperidino, morpholino, pipecolino, piperazino or hexamethylenimino, Z is oxa or imino and R and R' are lower alkyl.

8. As in claim 7, a compound of the formula

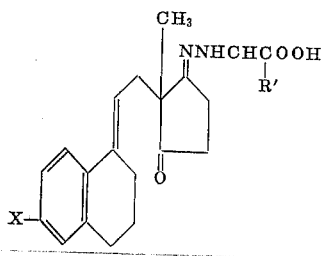

wherein X is lower alkoxy, di-(lower alkyl)amino, pyrrolidino, piperidino, morpholino, pipecolino, piperazino or hexamethylenimino and R' is lower alkyl.

9. As in claim 7, the compound which is α-{2-methyl-2-[2-(6-morpholino-1,2,3,4-tetrahydronaphth-1-yliden)ethyl]3-oxocyclopent-1-ylidenaminoxy}propionic acid.

10. As in claim 7, the compound which is α-{2-methyl-2-[2-(6-moropholino-1,2,3,4-tetrahydronaphth-1-yliden)ethyl]-3-oxocyclopent-1-ylidenaminoxy}isocaproic acid.

11. As in claim 7, the compound which is α-{2-methyl-2-[2-(6-methoxy-1,2,3,4-tetrahydronaphth-1-yliden)ethyl]-3-oxocyclopent-1-ylidenaminoxy propionic acid.

* * * * *

UNITED STATES PATENT OFFICE
CERTIFICATE OF CORRECTION

Patent No. 3,625,941          Dated December 7, 1971

Inventor(s) Raphael Pappo and Robert T. Nicholson

It is certified that error appears in the above-identified patent and that said Letters Patent are hereby corrected as shown below:

Column 9, formula,

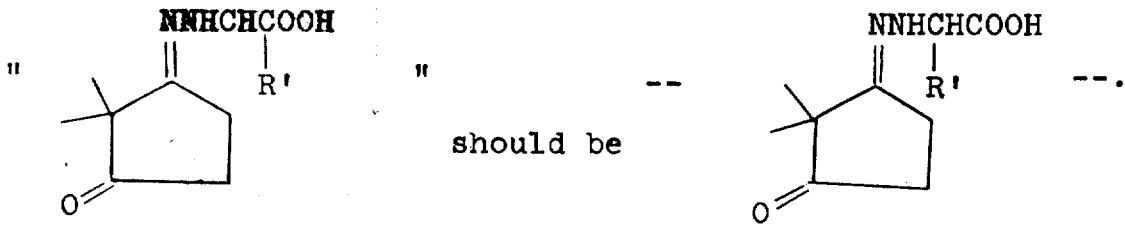

Column 10, line 5, ")ethyl]3-" should be -- )ethyl]-3- --.

Column 10, line 8, "-moropholino-" should be -- -morpholino- --.

Column 10, line 12, "-ylidenaminoxy propionic" should be -- -ylidenaminoxy)propionic --.

Signed and sealed this 27th day of June 1972.

(SEAL)
Attest:

EDWARD M. FLETCHER, JR.
Attesting Officer

ROBERT GOTTSCHALK
Commissioner of Patents